United States Patent [19]

Kaneko et al.

[11] 4,307,425
[45] Dec. 22, 1981

[54] BREATHING DEVICE FOR A CLOSED HOUSING OF A MAGNETIC MEMORY DEVICE

[75] Inventors: Reizo Kaneko, Higashi-yamato; Akio Tago, Mito; Shigemitsu Oguchi, Sayama; Shigehisa Hukui, Tokorozawa, all of Japan

[73] Assignee: Nippon Telegraph & Telephone Public Corporation, Tokyo, Japan

[21] Appl. No.: 80,247

[22] Filed: Oct. 1, 1979

[30] Foreign Application Priority Data

Oct. 2, 1978 [JP] Japan ............................ 53-120402
May 21, 1979 [JP] Japan ............................ 54-62538
Jul. 14, 1979 [JP] Japan ............................ 54-89561

[51] Int. Cl.³ ........................ G11B 5/012; B01F 3/02
[52] U.S. Cl. ................................... 360/98; 236/44 R
[58] Field of Search ................................... 360/97–99; 236/44 R–44 E

[56] References Cited

U.S. PATENT DOCUMENTS 3,620,584 11/1971 Rosensweig ................... 308/187.11
4,054,931 10/1977 Bolton et al. ......................... 360/98

OTHER PUBLICATIONS

Bolton, "Adjusting . . . Enclosures," IBM Tech. Disc. Bull, vol. 22, No. 8B, Jan. 1980, p. 3822.

Primary Examiner—Robert S. Tupper
Attorney, Agent, or Firm—Claude A. S. Hamrick

[57] ABSTRACT

In a magnetic memory device wherein a magnetic recording medium is rotated in a substantially closed chamber, there are provided a throttle between the inside and outside of the chamber, a first air filter for filtering air flowing through the throttle to prevent moisture from entering into the chamber by diffusion, a container containing a desiccating agent and communicated with the chamber, and a second air filter located between the desiccating agent container and the chamber. In a modified embodiment, another throttle is also provided between the desiccating agent container and the substantially closed chamber.

6 Claims, 5 Drawing Figures

BREATHING DEVICE FOR A CLOSED HOUSING OF A MAGNETIC MEMORY DEVICE

BACKGROUND OF THE INVENTION

1. Field of the Invention

This invention relates to a magnetic memory device utilizing a magnetic disc, a magnetic drum or a magnetic tape for use as a magnetic recording medium, and more particularly to a breathing device for a closed housing of a magnetic memory device.

2. Description of the Prior Art

In a magnetic memory device of the type referred to above, information is written into or read out from the magnetic recording medium through a magnetic head which is separated from the medium by a thin air gap the width of which is on the order of submicrons. For this reason, unless the interior of the housing containing the magnetic medium is maintained in a clean state free of any appreciable amount of dust, the recording medium will be contaminated or damaged thus degrading or destroying the recorded information. Also, since the recording medium is usually made of such metallic magnetic materials as Ni-Co-P alloys, unless the space in the housing is maintained at a low moisture condition, the magnetic materials will be oxidized to degrade the magnetic characteristics of the magnetic recording medium.

Furthermore, in a contact-start-stop recording system commonly utilized in a magnetic disc device, the magnetic head is in contact with the recording medium when the rotating disc has stopped or when its rotation is at a speed lower than a prescribed number of revolutions. If the air in the housing is maintained at a high humidity, the moisture contained in the air between the magnetic head and the magnetic recording medium will condense to form dew which creates a force of attraction between the head and the recording medium thus causing them to firmly adhere to each other. However, during the writing and reading out of the information, since an air layer, although extremely thin, exists between the magnetic head and the surface of the magnetic recording medium, the adhesion described above will not occur.

Although it is possible to construct the housing containing the magnetic recording head and the recording medium so that it is perfectly air tight, when designing the housing it is necessary to take into consideration the thermal expansion caused by the temperature rise within the housing caused by the running magnetic recording medium. In some cases, the difference between the minimum air temperature in the housing which occurs at non-run times and the maximum air temperature during running times exceeds 50° C. or more. Also the pressure difference between the inside and outside space of the housing, which causes thermal expansion and contraction of the air in the housing is larger than 0.1 atmospheres. In order to construct the sealed housing so that it has sufficient strength to withstand such a pressure difference, it is necessary to use a strong cover or an air tight seal thus complicating the construction and increasing the costs.

For this reason, according to a recent design, the housing is constructed as an ordinary closed housing and an air filter is provided between inside and outside thereof. Furthermore, a desiccator is installed in the housing to remove the moisture which is admitted into the housing mainly through the breather filter.

With this construction, however, it is not only necessary to add an air filter but also to use a substantial quantity of the desiccating agent. In other words, the outside surface of the air filter will be clogged by the dust deposited thereon when the air port "breathes" in accordance with variations in the housing temperature. To prevent such clogging over a long period of time, it is necessary to increase the area of the air filter. For example, when a commercially available air filter made of paper is used to accomodate a recording medium housing having a volume of 5l, it is necessary to make its area about 10 cm$^2$. Use of a filter having such a large area decreases the flow resistance at the suction port which substantially decreases the resistance to the air flowing into the chamber. Accordingly, when about 300 g of silica-gel is used as the desiccating agent it loses its moisture removing capability in only 3000 to 4000 hours, thus requiring frequent renewal of the desiccating agent. Thus, even though the frequent air suction and exhaust decreases the temperature difference and eliminates the pressure difference, diffusion occurs continuously due to the difference in the vapor pressures between the inside and outside of the housing. Therefore, the admission of moisture into the housing is inevitable. The amount of the moisture admitted into the housing from the diffusion described above is about 5 times that of the moisture suctioned into the housing due to the air pressure difference. Consequently, it becomes apparent that it is necessary to use a large amount of desiccating agent for removing all moisture.

SUMMARY OF THE INVENTION

Accordingly, it is a principal object of this invention to provide an improved breathing device for a closed housing or chamber of a magnetic memory device that can maintain a desired environment in the closed housing.

Another object of this invention is to provide a novel breathing device for a closed housing of a magnetic memory device capable of elongating the useful life of a desiccating agent utilized to maintain a low moisture environment in the closed housing.

Still another object of this invention is to provide an improved breathing device for a closed housing of a magnetic memory device capable of discharging air that has been expanded by the temperature rise in the closed housing during operation of the device without using a sealing device of special construction and without imparing the desired environment in the housing.

A further object of this invention is to provide an improved breathing device for a closed housing of a magnetic memory device capable of reducing as far as possible the volume in the housing which is desired to be maintained at a desired environment, thus enabling the desired environment in the housing to be maintained over a long time.

According to this invention these and further objects can be accomplished by providing a breathing device for a closed housing of a magnetic memory device comprising a magnetic memory medium, a substantially closed chamber containing the magnetic memory means, a restricted air passage interconnecting inside and outside of the substantially closed chamber, a first air filter for filtering air passing through the restricted air passage, a container containing a desiccating agent and communicated with the chamber, and a second air filter located between the desiccating agent container and the chamber.

According to a modified embodiment, there is provided a breathing device for a closed housing of a magnetic memory device comprising a magnetic memory medium, a first restricted air passage interconnecting inside and outside of the substantially closed chamber, a first air filter for filtering air passing through the first restricted air passage, a container containing a desiccating agent and communicated with the substantially closed chamber, a second restricted air passage disposed between the desiccating agent container and the substantially closed chamber, and a second air filter for filtering air passing through the second restricted air passage.

According to still another modification of this invention, there is provided a magnetic memory device comprising a magnetic recording medium, a substantially closed chamber containing the magnetic recording medium, means disposed adjacent the substantially closed chamber for driving the magnetic recording medium, a first restricted air passage for intercommunicating the inside and outside of the substantially closed chamber, a first air filter for filtering air passing through the first restricted air passage, a container for containing a desiccating agent and communicated with the substantially closed chamber, a second restricted air passage disposed between the desiccating agent container and the substantially closed chamber, a second air filter for filtering air passing through the second restricted air passage, and a magnetic fluid seal located between the substantially closed chamber and the drive means.

IN THE DRAWING

DESCRIPTION OF THE PREFERRED EMBODIMENTS

Figure 1:
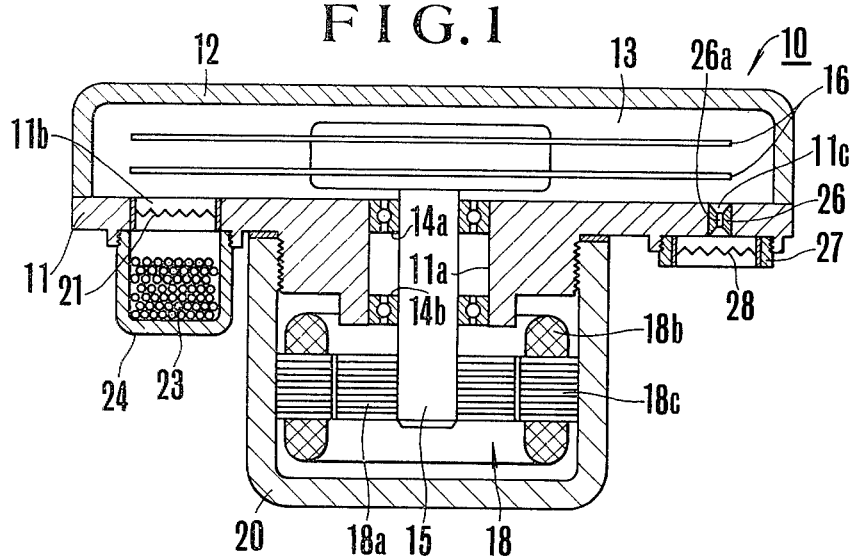
FIG. 1 is a longitudinal sectional view showing a magnetic memory device utilizing a breathing device for a closed housing embodying the invention.

In a preferred embodiment of this invention illustrated in FIG. 1, the magnetic memory device 10 comprises a base 11 for supporting various elements to be described later and an inverted cup-shaped cover 12 mounted on the base for defining therebetween a closed chamber 13. The closed chamber contains the magnetic recording media or magnetic discs in this example. At the center of the base 11 a shaft opening 11a is formed through which extends a spindle 15 rotatably journalled by a pair of bearings 14a and 14b. The upper end of the spindle 15 extends into the chamber 13 for supporting a plurality of superposed discs 16, whereas the lower end of the spindle 15 is secured to a rotor 18a of an electric motor 18. Motor 18 is surrounded by a stator core 18c which is wound with a primary coil 18b. The motor 18 is contained in a casing 20 which is threaded to the bottom of the base 11 through an O-ring. Accordingly, the motor 18 is air tightly contained in the casing 20. As shown, at least two air vent openings 11b and 11c are provided near the shaft opening 11a of the base 11. The air vent opening 11b has a slightly larger diameter than that of the opening 11c so that an air filter 21 can be mounted therein. Secured to the outer surface of the base 11, immediately beneath the vent opening 11b, is a threaded container 24 which is filled with a well known desiccating agent 23. Thus, the filter 21 functions to prevent dust from entering into the chamber 13 from the side of the container 24 containing the desiccating agent 23.

A throttle or restricted opening 26 which characterizes the invention is contained in the other air vent opening 11c, and a supporting ring 27 is threaded and secured to the lower surface of the base 11 at a portion beneath the vent opening 11c. An air filter 28 is contained in the supporting ring 27 and functions to prevent dust in the outside atmosphere from entering into the chamber 13.

With this construction, the throttle 26 provides the breathing function with a rather low air flow resistance, thereby preventing the air pressure in the chamber 13 from varying excessively with respect to the external atmosphere as the temperature in the chamber 13 is raised or lowered. This minimizes as much as possible admission of the moisture from the outside atmosphere caused by moisture diffusion. Advantageously, the diameter of the throttle 26 should be small so that the pressure difference in the air on the inside and outside of the chamber 13 should be less than 40 mmWG, preferably, from 10 to 40 mmWG. More particularly, entrance of moisture can be more effectively reduced as the diameter of the opening 26a of the throttle 26 decreases. On the other hand, where it is desirable to increase the pressure difference, such increase requires an improvement in the air tightness of the chamber 13, thus complicating the construction.

It is important to note that in suppressing the pressure difference caused by the temperature rise in the chamber 13, the upper limit of such pressure difference is limited by the pressure resistant property of a magnetic fluid seal utilized at the shaft bearing. Usually, the pressure resistant property of a magnetic fluid seal is on the order of 100 mmWG; however, it is advantageous to set a desirable upper limit of the pressure difference to 40 mmWG by taking into consideration such factors as the safety factor, the air tightness of the device, etc. Although there is no limit for permissible lower limit of the pressure difference, it is advantageous to set it to 10 mmWG. This allows the use of a small diameter throttle for the purpose of efficiently preventing moisture in the atmosphere from entering into the space due to moisture diffusion.

Where a permissible value of the pressure difference on the inside and outside of chamber containing the magnetic recording medium is set as above described, it is possible to calculate the diameter and the flow resistance of the throttle corresponding to the set value.

Assuming that the chamber 13 has a volume of 5l and that the rate of temperature lowering is 30° C./hour, that is, 0.5° C./min., the amount of air Q flowing into the chamber 13 can be shown by the following equation:

$$5,000 \times \frac{0.5}{273 + 27} = 8.3 \text{ cc/min.} = 8.3 \times 10^{-3} l/\text{min.}$$

On the other hand, the flow resistance R is shown by $R = (\Delta P/Q)$, and since the permissible value $\Delta P$ of the pressure difference is equal to 10 mmWG–40 mmWG, the flow resistance for this pressure difference is equal to 7.14 g/cm²/cc/sec.–28.6 g/cm²/cc/sec. or 600 mmWG/l/min.–2400 mmWG/l/min.

Accordingly, the diameter of the throttle having such a flow resistance can be calculated with the following equation utilized to determine the diameter of an orifice:

$$Q = c\frac{\pi d^2}{4}\sqrt{2gH}$$

In the above equation, Q represents flux; H a hydrostatic head; d the diameter of the orifice; g the acceleration by gravity; and c the coefficient of flux (0.99≃1). Thus, with the data given above, the diameter of the throttle is calculated as 0.63–0.45 mm.

Then, for the purpose of determining the flow resistance of the throttle, the ratio of this flow resistance to the flow resistance of the air filter 28 (used as a reference) utilizing an absolute paper filter is calculated. Typically, the flow resistance of the absolute filter amounts to about 1 g/cm$^2$/cc/sec. or 84 mmWG/l/min. Assume now that the volume of the chamber containing the magnetic discs is 5 l and that the area of the filter is 10 cm$^2$, then the flow resistance of the filter will be 0.1 g/cm$^2$/cc/sec. or 8.4 mmWG/l/min. Accordingly, the flow resistance of the throttle will be about 70 to 290 times that of the flow resistance of the air filter which is used as the reference.

Provision of a throttle having such a small diameter between the chamber 13 and the outside atmosphere is sufficient to prevent moisture in the atmosphere from entering into the chamber 13 by diffusion.

Figure 2A:
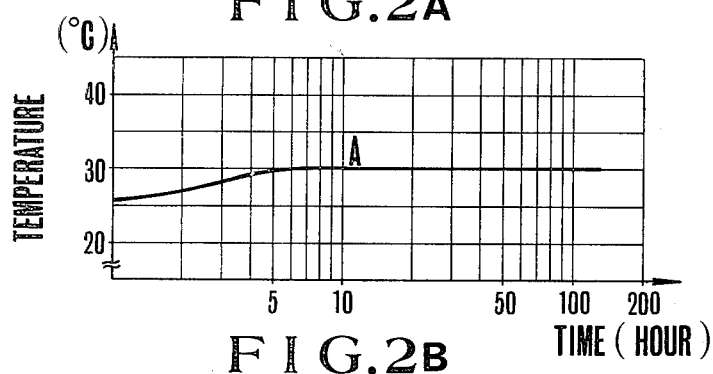
FIGS. 2A and 2B are graphs showing characteristic curves useful in explaining the advantages of this invention.
Figure 2B:
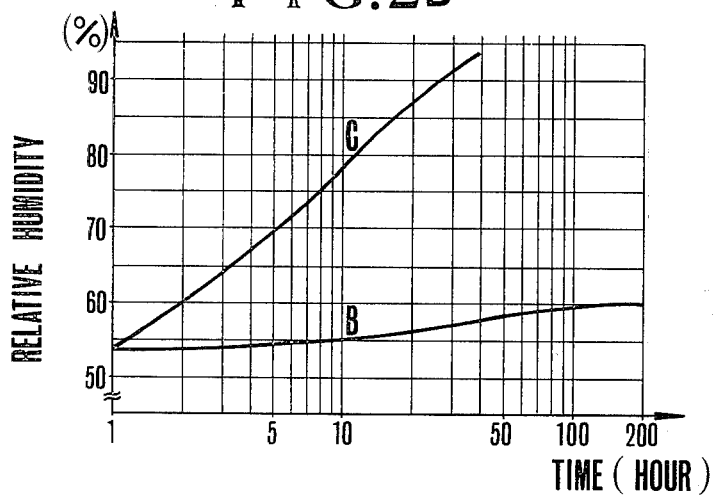

FIGS. 2A and 2B show variation in temperature and humidity in a sealed container having a volume of about 5 l and provided with a throttle having a diameter of 0.6 mm and a length of 1 mm. The sealed container has an initial temperature of 27° C. and an initial humidity of 54% after it has been maintained in a tank having a constant temperature of 30° C. and a constant relative humidity of 95%. As shown in FIG. 2A, the temperature A became substantially equal to that prevailing in the tank after about 5 hours, whereas, as shown in FIG. 2B, the relative humidity B, even after 120 hours, has increased to only about 60% and thereafter increased gradually. As a control, a sealed container having an opening area of 100 cm$^2$ and provided with a throttle was left stand-still in the tank under the same conditions. The humidity of the container became nearly equal to that in the tank after 24 hours, as shown in curve C in FIG. 2B. Thus, these experimental results show that the provision of a throttle efficiently reduces the moisture in the atmosphere entering into the sealed container, and it is possible not only to maintain the interior of the magnetic disc chamber 13 at a low relative humidity over a long time, but also to elongate the useful life of the desiccating agent 23. The results of the experiment also show that, with the prior art construction, it was necessary to renew the desiccating agent at every 3,000 hours, whereas according to this invention the life of the desiccator was extended to about 40,000 hours.

Figure 3:
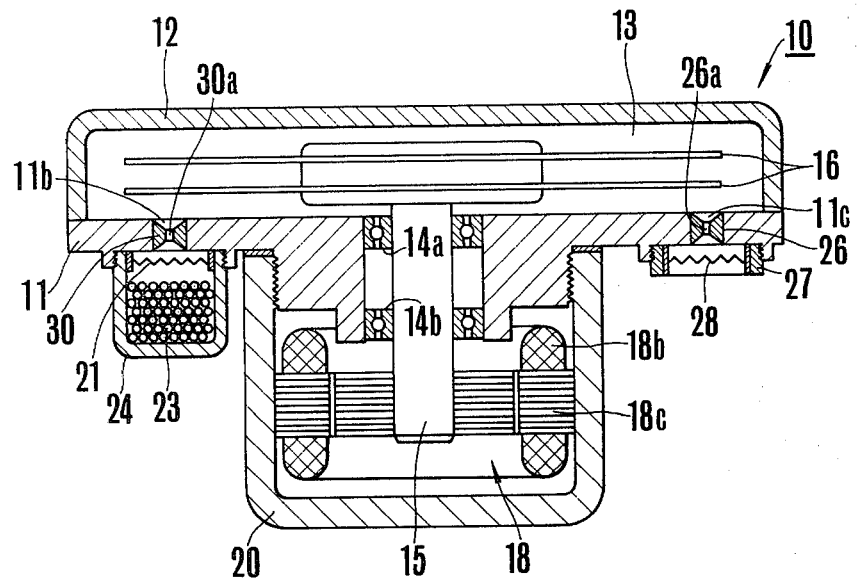
FIGS. 3 and 4 are longitudinal sectional views showing modified embodiments of this invention.

FIG. 3 shows another modification of this invention in which elements corresponding to those shown in FIG. 1 are designated by the same reference characters. According to this modification, in addition to a first throttle 26 in the vent opening 11c between the chamber 73 and the outside atmosphere, there is also provided an additional throttle 30 in the vent opening 11b. The diameter of the opening 30a of this additional throttle 30 is selected to be about 0.63–0.45 mm, exactly in the same manner as that of the throttle 26. Of course, the purpose of this throttle 26 is for preventing excessive removal of the moisture in the chamber 13, thus elongating the life of the desiccating agent 23. Although the first throttle 26 is effective to elongate the life of the desiccating agent 23, the mere provision of the throttle 26 excessively decreases the humidity in the chamber 13, thus resulting in a waste of the desiccating agent.

As above described, in order to prevent oxidation of the magnetic disc as well as the adhesion between the magnetic head and the magnetic disc, it is generally recognized that it is necessary to limit the relative humidity in the magnetic disc chamber to be less than 80%. However, where only the first throttle 26 is provided and the second throttle 30 is not provided, the humidity in the chamber becomes far below the upper limit of the permissible relative humidity due to the high moisture removing ability of the desiccating agent. This means that the vapor pressure difference between the inside and the outside of the chamber 13 enhances the moisture invasion. Furthermore, when no maintenance operation is performed for the apparatus over a long time, the amount of desiccating agent actually increases, thus necessitating an increase in the size of the container thereof.

Figure 4:
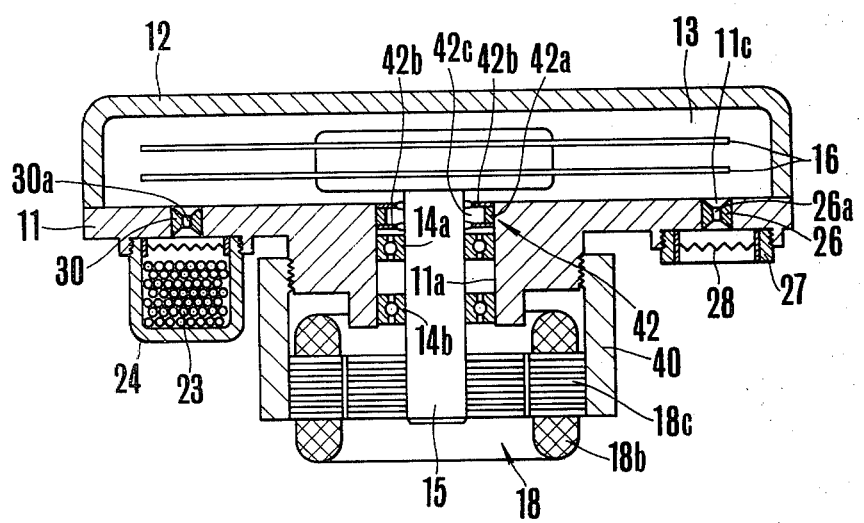

FIG. 4 shows still another modification of this invention wherein the electric motor 18 is installed on the outside of the sealed chamber, and is secured to the bottom of the base 11 through a cylindrical supporting member 40. In the same manner as in the foregoing embodiments, the spindle 11 is rotatably supported by bearings 14a and 14b to extend through the spindle opening 11a. A magnetic fluid seal 42 is provided at the portion of the spindle opening which is facing the magnetic disc chamber 13. Usually, the magnetic fluid seal 42 comprises an annular permanent magnet 42a, a pair of annular yokes 42b, and magnetic fluid 42c as disclosed in the U.S. Pat. No. 3,620,584.

With this construction, the sealed space is limited to the space inside of the magnetic fluid seal; and the motor 18, which generates a relatively large amount of heat during operation, is located on the outside of the sealed chamber. When this modification it is possible to decrease the temperature rise in the sealed chamber substantially more than the prior art construction. Consequently, it is possible to decrease the amount of air sucked into and discharged from the chamber 13 (caused by the temperature difference between the inside and outside thereof), thus preventing waste and clogging of the air filter.

Although in the embodiments shown in FIGS. 3 and 4 throttles 26 and 30 were prepared independently of the base 11, where the environment in which the apparatus is used and the volume of the magnetic disc chamber 13 are given, it is possible to form fine perforations through the base 11 to act as throttles. Also, instead of disposing the desiccator container 24 on the outside of the chamber 13, the container and desiccator contained therein may be installed in the chamber, minimizing the size of the apparatus.

Although the present invention has been described above in terms of presently preferred embodiments, it is to be understood that such disclosure is by way of example only and is not intended to be considered as limiting. Accordingly, it is intended that the appended claims are to be interpreted as covering all alterations and modifications as fall within the true spirit and scope of the invention.

What is claimed is:

1. A breathing device for a closed housing of a magnetic memory device including magnetic memory media and a substantially closed chamber containing said magnetic memory media comprising:
   a restricted air passage interconnecting the inside and outside of said substantially closed chamber, said restricted air passage having a flow resistance such that the pressure difference between the inside and outside of said chamber is within the range of from 10 to 40 mmWG;
   a first air filter for filtering air passing through said restricted air passage;
   a container containing a desiccating agent and communicated with said chamber; and
   a second air filter located between said desiccating agent container and said chamber.

2. A breathing device according to claim 1 wherein said magnetic memory media are in the form discs.

3. A breathing device for a closed housing of a magnetic memory device including magnetic recording media and a substantially closed chamber containing said magnetic memory media comprising:
   a first restricted air passage interconnecting the inside and outside of said substantially closed chamber;
   a first air filter for filtering air passing through said first restricted air passage;
   a container containing a desiccating agent and communicated with said substantially closed chamber;
   a second restricted air passage disposed between said desiccating agent container and said substantially closed chamber; and
   a second air filter for filtering air passing through said second restricted air passage.

4. A breathing device according to claim 3 wherein said first restricted air passage has a flow resistance such that the pressure difference between the inside and outside of said substantially closed chamber is less than 40 mmWG.

5. A breathing device according to claim 3 wherein said pressure difference is from 10 to 40 mmWG.

6. A breathing device for a closed housing of a magnetic memory device including a magnetic recording medium, a substantially closed chamber containing said magnetic recording medium and means disposed adjacent said substantially closed chamber for driving said magnetic recording medium comprising;
   a first restricted air passage for intercommunicating the inside and outside of said substantially closed chamber;
   a first air filter for filtering air passing through said first restricted air passage;
   a container for containing a desiccating agent and communicated with said substantially closed chamber;
   a second restricted air passage disposed between said desiccating agent container and said substantially closed chamber;
   a second air filter for filtering air passing through said second restricted air passage; and
   a magnetic fluid seal located between said substantially closed chamber and said drive means.

* * * * *